United States Patent
Bhattacharya et al.

(10) Patent No.: US 11,844,074 B2
(45) Date of Patent: Dec. 12, 2023

(54) SYSTEM AND METHODS TO INCREASE UPLINK DATA THROUGHPUT ON A TD-LTE (A) SYSTEM USING EFFICIENT MANAGEMENT OF PHYSICAL UPLINK CONTROL CHANNELS

(71) Applicant: Marvell Asia Pte, Ltd., Singapore (SG)

(72) Inventors: Sudip Bhattacharya, Bangalore (IN); Anshuman Bose, Bangalore (IN); Shashideep Nuggehalli, Bangalore (IN)

(73) Assignee: Marvell Asia Pte Ltd, Singapore (SG)

( * ) Notice: Subject to any disclaimer, the term of this patent is extended or adjusted under 35 U.S.C. 154(b) by 125 days.

(21) Appl. No.: 16/948,965

(22) Filed: Oct. 7, 2020

(65) Prior Publication Data
US 2021/0120542 A1    Apr. 22, 2021

Related U.S. Application Data

(60) Provisional application No. 62/916,481, filed on Oct. 17, 2019.

(51) Int. Cl.
*H04W 72/12* (2023.01)
*H04W 72/21* (2023.01)
*H04L 1/18* (2023.01)
*H04L 5/14* (2006.01)

(52) U.S. Cl.
CPC ............. *H04W 72/21* (2023.01); *H04L 1/18* (2013.01); *H04L 5/14* (2013.01)

(58) Field of Classification Search
CPC . H04L 1/0026; H04L 1/1861; H04W 72/0413
See application file for complete search history.

(56) References Cited

U.S. PATENT DOCUMENTS

| | | | |
|---|---|---|---|
| 2013/0242890 A1* | 9/2013 | He | H04L 5/0055 370/329 |
| 2018/0014323 A1* | 1/2018 | Huang | H04W 72/1284 |
| 2018/0035451 A1* | 2/2018 | Krishnamoorthi | H04L 5/0094 |
| 2018/0359057 A1* | 12/2018 | Yang | H04L 1/1812 |
| 2019/0098654 A1* | 3/2019 | Li | H04W 72/1247 |
| 2022/0038153 A1* | 2/2022 | Guo | H04L 5/0035 |

* cited by examiner

*Primary Examiner* — Bo Hui A Zhu (57) ABSTRACT

A new approach is proposed to increase uplink traffic throughput of a time division duplex (TDD) system, e.g., a TD-LTE (A) system, by configuring a plurality of PUCCH parameters for an UE in the TDD system. Specifically, the PUCCH parameters of an uplink channel between the UE in the TDD system are configured and stored in the UE and a base station/cell (eNodeB) of the TDD system in such a manner that the PUCCH region utilized by the UE is restricted to only a few RBs and the PUSCH region of the uplink channel is maximized in terms of RBs available for transmission over the uplink channel, thereby increasing the uplink throughput at the eNodeB level of the TD-LTE (A) system. The configured PUCCH parameters include channel quality indicator (CQI) information/report, which is an indicator carrying the information on how good/bad the communication channel quality is in the TDD system.

35 Claims, 6 Drawing Sheets

| 24 | PRIMARY CELL (PCELL) CQI Resource # 1 | | PRIMARY CELL (PCELL) CQI Resource # 0 | |
|---|---|---|---|---|
| 23 | CQI Resource SECONDARY CELL (SCELL) 2 | | CQI Resource SECONDARY CELL (SCELL) 1 | |
| 22 | PUCCH Format 3 Resource # 1 | | PUCCH Format 3 Resource # 0 | |
| 21 | SPS / An-Repeat, Rel. 10 Res # 0~3 | | SR Resource # 0 | |
| 20 | Fmt 1b-CS Res # 0~3 List # 0 Resource #1 | | Fmt 1b-CS Res # 0~3 List # 0 Resource #0 | |
| 19 | Fmt 1b-CS Res # 0~3 List # 1 Resource #1 | | Fmt 1b-CS Res # 0~3 List # 1 Resource #0 | |
| 18 | PUSCH Resource # 12 | PUSCH Resource # 12 | PUSCH Resource # 12 | PUSCH Resource # 12 |
| 17 | PUSCH Resource # 11 | PUSCH Resource # 11 | PUSCH Resource # 11 | PUSCH Resource # 11 |
| 16 | PUSCH Resource # 10 | PUSCH Resource # 10 | PUSCH Resource # 10 | PUSCH Resource # 10 |
| 15 | PUSCH Resource # 9 | PUSCH Resource # 9 | PUSCH Resource # 9 | PUSCH Resource # 9 |
| 14 | PUSCH Resource # 8 | PUSCH Resource # 8 | PUSCH Resource # 8 | PUSCH Resource # 8 |
| 13 | PUSCH Resource # 7 | PUSCH Resource # 7 | PUSCH Resource # 7 | PUSCH Resource # 7 |
| 12 | PUSCH Resource # 6 | PUSCH Resource # 6 | PUSCH Resource # 6 | PUSCH Resource # 6 |
| 11 | PUSCH Resource # 5 | PUSCH Resource # 5 | PUSCH Resource # 5 | PUSCH Resource # 5 |
| 10 | PUSCH Resource # 4 | PUSCH Resource # 4 | PUSCH Resource # 4 | PUSCH Resource # 4 |
| 9 | PUSCH Resource # 3 | PUSCH Resource # 3 | PUSCH Resource # 3 | PUSCH Resource # 3 |
| 8 | PUSCH Resource # 2 | PUSCH Resource # 2 | PUSCH Resource # 2 | PUSCH Resource # 2 |
| 7 | PUSCH Resource # 1 | PUSCH Resource # 1 | PUSCH Resource # 1 | PUSCH Resource # 1 |
| 6 | PUSCH Resource # 0 | PUSCH Resource # 0 | PUSCH Resource # 0 | PUSCH Resource # 0 |
| 5 | Fmt 1b-CS Res # 0~3 List # 1 Resource #0 | | Fmt 1b-CS Res # 0~3 List # 1 Resource #1 | |
| 4 | Fmt 1b-CS Res # 0~3 List # 0 Resource #0 | | Fmt 1b-CS Res # 0~3 List # 0 Resource #1 | |
| 3 | SR Resource # 0 | | SPS / An-Repeat, Rel. 10 Res # 0~3 | |
| 2 | PUCCH Format 3 Resource # 0 | | PUCCH Format 3 Resource # 1 | |
| 1 | CQI Resource SECONDARY CELL (SCELL) 1 | | CQI Resource SECONDARY CELL (SCELL) 2 | |
| 0 | PRIMARY CELL (PCELL) CQI Resource # 0 | | PRIMARY CELL (PCELL) CQI Resource # 1 | |

FIG. 3

|   | 0 | 1 | | | 2 | 3 | 4 | 5 | 6 | | | 7 | 8 | 9 |
|---|---|---|---|---|---|---|---|---|---|---|---|---|---|---|
| | | DwPTS | GAP | UpPTS | | | | | DwPTS | GAP | UpPTS | | | |
| 0 | D | | | | U | U | U | D | | | | U | U | U |
| 1 | D | | | | U | U | U | D | | | | U | U | D |
| 2 | D | | | | U | U | D | D | | | | U | D | D |
| 3 | D | | | | U | U | U | D | D | D | D | D | D | D |
| 4 | D | | | | U | U | D | D | D | D | D | D | D | D |
| 5 | D | | | | U | D | D | D | D | D | D | D | D | D |
| 6 | D | | | | U | U | U | D | | | | U | U | D |

FIG. 4

| Delta PUCCH Shift | Bandwidth | Maximum Number of RBs required for PUCCH 1a and 1b | | | | | | |
|---|---|---|---|---|---|---|---|---|
| | | UL DL 0 | UL DL 1 | UL DL 2 | UL DL 3 | UL DL 4 | UL DL 5 | FDD |
| 1 | 3 MHz | 1 | 1 | 2 | 2 | 2 | 4 | 1 |
| | 5 MHz | 1 | 2 | 3 | 2 | 3 | 6 | 1 |
| | 10 MHz | 2 | 3 | 5 | 4 | 5 | 11 | 2 |
| | 15 MHz | 2 | 4 | 8 | 6 | 8 | 17 | 2 |
| | 20 MHz | 3 | 5 | 10 | 8 | 10 | 22 | 3 |
| 2 | 3 MHz | 1 | 2 | 3 | 3 | 3 | 7 | 1 |
| | 5 MHz | 2 | 3 | 5 | 4 | 5 | 11 | 2 |
| | 10 MHz | 3 | 5 | 10 | 8 | 10 | 22 | 3 |
| | 15 MHz | 4 | 8 | 15 | 11 | 15 | 33 | 4 |
| | 20 MHz | 5 | 10 | 20 | 15 | 20 | 44 | 5 |
| 3 | 3 MHz | 2 | 3 | 5 | 4 | 5 | 10 | 2 |
| | 5 MHz | 2 | 4 | 8 | 6 | 8 | 17 | 2 |
| | 10 MHz | 4 | 8 | 15 | 11 | 15 | 33 | 4 |
| | 15 MHz | 6 | 11 | 22 | 17 | 22 | 50 | 6 |
| | 20 MHz | 8 | 15 | 30 | 22 | 30 | 66 | 8 |

SYSTEM AND METHODS TO INCREASE UPLINK DATA THROUGHPUT ON A TD-LTE (A) SYSTEM USING EFFICIENT MANAGEMENT OF PHYSICAL UPLINK CONTROL CHANNELS

CROSS-REFERENCE TO RELATED APPLICATIONS

This application claims the benefit of U.S. Provisional Patent Application No. 62/916,481, filed Oct. 17, 2019, which is incorporated herein in its entirety by reference.

BACKGROUND

Time division duplex (TDD or TD) long-term evolution (LTE) advanced (A) (TD-LTE (A)) systems are widely used for wireless broadband communication between a plurality of user equipments (UEs), e.g., mobile devices and data terminals, and base stations. Traditional methods utilize one or more physical uplink control channel (PUCCH) regions of a physical uplink channel of a TD-LTE (A) system as control channels to carry a set of uplink control information (UCI) from the UEs to the base station. The configuration of the PUCCH regions, however, may be sub-optimal, which limits radio bearer or resource block (RB) reservation on the PUCCH. For a non-limiting example, with a 10 ms subframe assignment configuration, the impact of sub-optimal PUCCH configuration increases the reservation of spectrum for the PUCCH regions, thereby reducing space for shared data channel such as physical uplink shared channel (PUSCH) region, causing the effective uplink throughput of the UEs to drop across bandwidth of, e.g., 5 MHz, 10 MHz, 15 MHz and 20 MHz, etc. As a result, the amount of spectrum available for the uplink and downlink channels of the TD-LTE (A) system is asymmetric as the maximum throughput on the uplink channel is reduced due to sub-optimal PUCCH configuration, which causes poor PUSCH region utilization for uplink data sharing via the uplink channel since the same uplink channel is shared between both the PUCCH and PUSCH.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 depicts an example of allocation of 5 MHz PUSCH region in the physical uplink channel of the TD-LTE (A) system according to an aspect of the present embodiments.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts and the terminology is not intended to be limiting. Unless defined otherwise, all technical and scientific terms used herein have the same meaning as commonly understood in the art to which the embodiments pertain.

A new approach of systems and methods is proposed to increase uplink traffic throughput of a time division duplex (TDD) system, e.g., a TD-LTE (A) system, by configuring a plurality of PUCCH parameters for an UE in the TDD system. Specifically, the PUCCH parameters of an uplink channel between the UE in the TDD system are configured and stored in the UE and a base station/cell (eNodeB) of the TDD system in such a manner that the PUCCH region utilized by the UE is restricted to only a few (one or more) RBs and the PUSCH region of the uplink channel is maximized in terms of RBs available for transmission over the uplink channel, thereby increasing the uplink throughput at the eNodeB level of the TD-LTE (A) system. In some embodiments, the PUCCH parameters are configured and included in a form of a channel quality indicator (CQI) report, which carries information on the configuration and/or quality of the communication channel in the TDD system.

Under the proposed approach, the number of RB allocated and used by the PUCCH in the uplink channel is reduced and restricted. Consequently, the proposed approach achieves increased system uplink data throughput for the uplink channel between the UE and the base station in the TDD system by reserving more RB of the uplink channel for uplink data transmission instead of control information transmission. With improved uplink data throughput, the eNodeB of the TDD system is able to support a growing number of UEs and their users. Note that reducing and/or restricting RBs allocated to the control channel is not defined by TDD or TD-LTE (A) specifications.

Although a TD-LTE (A) system is used as a non-limiting example hereinafter to illustrate the proposed approach, it is appreciated that the same or similar approach can also be applied to any TDD system by one ordinarily skilled in the art.

Figure 1:
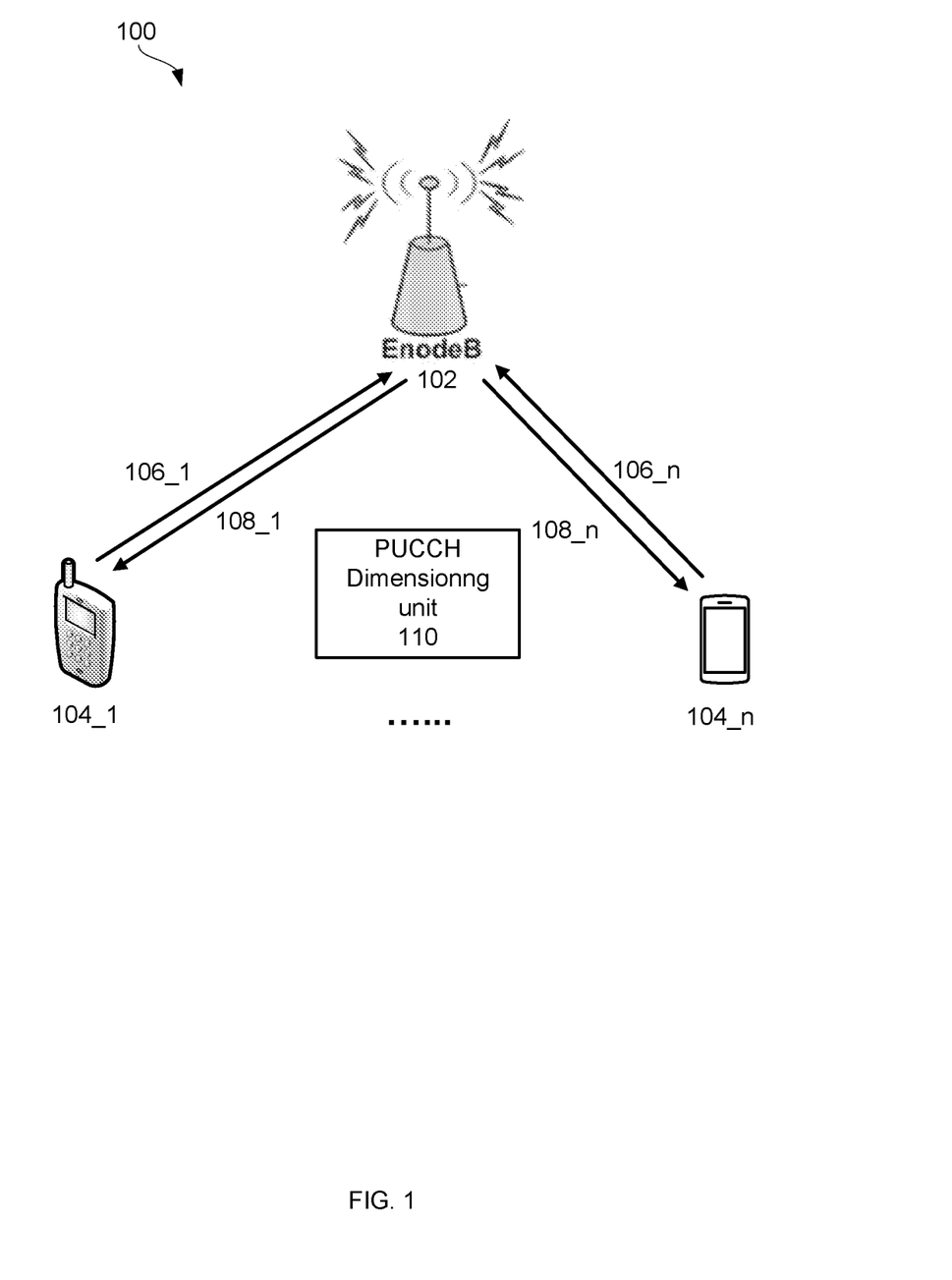
FIG. 1 depicts an example of a diagram of a system to support uplink data throughput improvement for a TD-LTE (A) system according to an aspect of the present embodiments.

FIG. 1 depicts an example of a diagram of a TD-LTE (A) system 100 to support uplink data throughput improvement for the system. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a base station/cell/eNodeB 102, a plurality of UEs 104, a physical uplink channel 106 (including both the PUCCH and the PUSCH) and a physical downlink channel 108 between each of the plurality of UEs 104 and the eNodeB 102, and a PUCCH dimensioning unit 110. Each of these components in the system 100 is a computing/communicating device, which includes one or more processors with software instructions stored in a storage unit such as a non-volatile memory for practicing one or more processes. Each of these components can be programmed via the software instructions. When the software instructions are executed by the one or more processors, at least a subset of the software instructions is loaded into a memory unit, which becomes a special purposed one for practicing the processes. The processes may also be at least partially embodied in the computing/communicating device into which computer program code is loaded and/or executed, such that, the device becomes a special purpose computing unit for practicing the processes.

Each of these components in the system 100 has a communication interface (not shown), which enables the UE 104 to communicate with the eNodeB 102 and/or other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, mobile communication network, corporate network, enterprise network, campus network etc. The physical connections of the network and the communication protocols are well known to those of skill in the art.

In the example of FIG. 1, each UE 104 can be a computing device, a communication device, a storage device, or any computing device capable of running a software component. For non-limiting examples, a computing device can be but is not limited to a server computer, a laptop computer, a desktop computer, a tablet, a Google Android device, an iPhone, an iPad, a set-top box, a video game console, an Internet of Things (IoT) device, and a voice-controlled speaker or controller.

Figure 2:
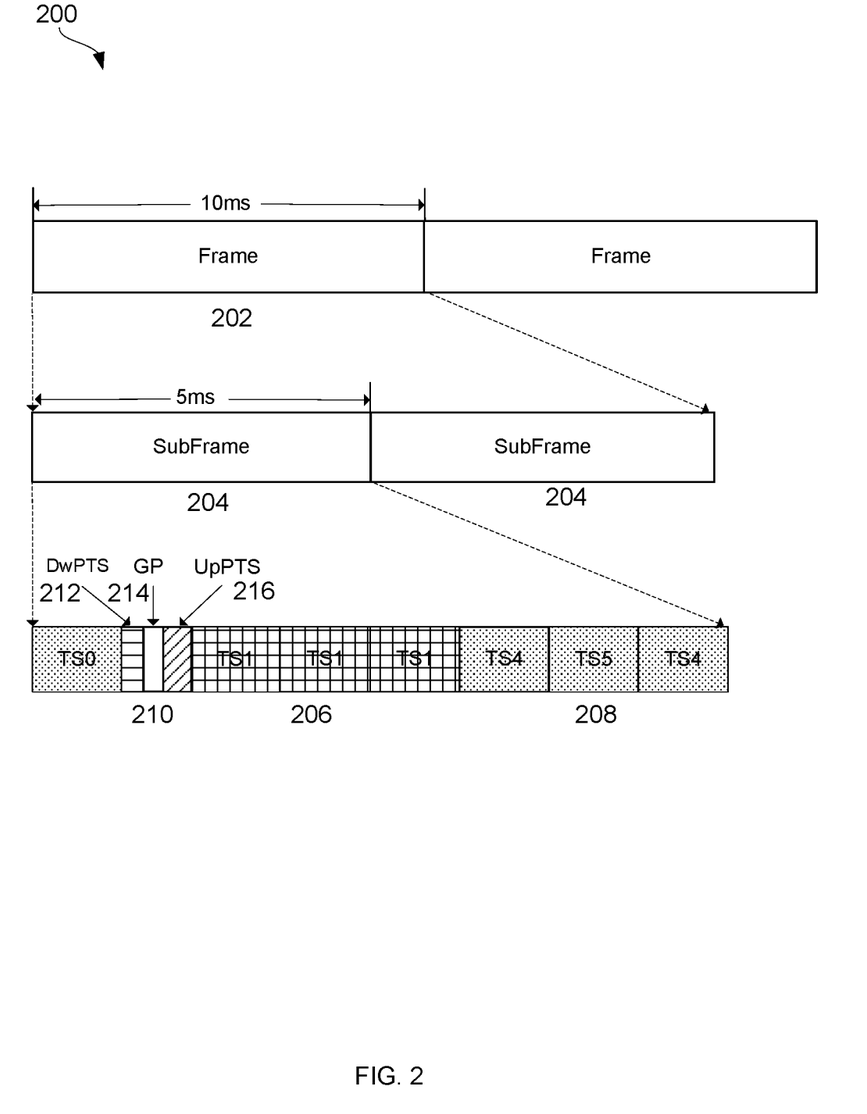
FIG. 2 depicts an example of a frame structure used for communication in the TD-LTE (A) system according to an aspect of the present embodiments.

FIG. 2 depicts an example of a structure of a frame 200 used for communication in the TD-LTE (A) system 100. In the frame structure 200, one system frame 202 with a length of, e.g., 10 ms (307200 Ts), is divided into two half frames 204's of 5 ms (153600 Ts) long each. Each of five components of a half frame 204 comprises one or more D or DL (Downlink) sub-frames 206, one or more U or UL (Uplink) sub-frames 208, or a special sub-frame (SSF) 210, which itself composed of downlink pilot time slot (DwPTS) region 212 (for downlink synchronization), gap 214, and uplink pilot time slot (UpPTS) region 216 (for uplink synchronization). In some embodiments, the UpPTS region 216 in the frame structure 200 can be used for sounding reference signal (SRS) transmission, wherein the SRS is a reference signal transmitted by the UE 104 in the uplink direction and used by the eNodeB 102 to estimate the uplink channel quality over a wide bandwidth as measured by a CQI report. In some embodiments, the CQI report can be of two types, periodic or aperiodic upon request. In some embodiments, the CQI report is transmitted periodically with a certain transmission time interval (TTI) as an indication of the uplink channel quality (e.g., good or bad). For non-limiting examples, the CQI periodicity for the UE 104 in the TD-LTE (A) system 100 can be one of {1, 5, 10, 20, 40, 80, 160} ms; the scheduling request (SR) periodicity for the UE 104 in the TD-LTE (A) system 100 can be one of {5, 10, 20, 40, 80} ms, and the SRS periodicity in TDD for the UE 104 in the TD-LTE (A) system 100 can be one of {2, 5, 10, 20, 40, 80, 160, 320} ms.

In some embodiments, resources in terms of RB locations allocated to a UE 104 for reporting of downlink (DL) acknowledgement (A/N) in an adjusted U subframe 208 on the PUCCH of the physical uplink channel 106 is dependent upon the formulae $$n_{PUCCH}^{(1)}=(M-m-1)\times N_p+m\times N_{p+1}+n_{CCE}+N_{PUCCH}^{(1)}$$
$$\text{and } n_{PUCCH,i}^{(1)}=(M-i-1)\times N_p+i\times N_{p+1}+n_{CCE,i}+N_{PUCCH}^{(1)},$$

The location of PUCCH Formats 1, 1a and 1b is determined by the formulae:

$$m = \begin{cases} N_{RB}^{(2)} \\ \left\lfloor \dfrac{n_{PUCCH}^{(1)}-c\cdot N_{cs}^{(1)}/\Delta_{shift}^{PUCCH}}{c\cdot N_{sc}^{RB}/\Delta_{shift}^{PUCCH}} \right\rfloor + N_{RB}^{(2)} + \left\lceil \dfrac{N_{cs}^{(1)}}{8} \right\rceil & \text{otherwise} \\ \quad \text{if } n_{PUCCH}^{(1)} < c\cdot N_{cs}^{(1)}/\Delta_{shift}^{PUCCH} \end{cases}$$

the location of PUCCH Formats 2, 2a and 2b is determined by $$m=\lfloor n_{PUCCH}^{(2)}/N_{sc}^{RB} \rfloor$$

and, the location for PUCCH Format 3 is given by $$m=\lfloor n_{PUCCH}^{(3,\tilde{p})}/N_{SF,0}^{PUCCH} \rfloor$$

In all of the above formulae for PUCCH Formats 1, 1a, 1b and 2, 2a, 2b and 3, the parameter 'm' denotes the location of the PUCCH numbered from the lowest RB of the channel bandwidth. The meaning of the rest of the parameters are as follows:

$N_{CS}$ Cyclic shift value used for random access preamble generation $N_{cs}^{(1)}$ Number of cyclic shifts used for PUCCH formats 1/1a/1b in a resource block with a mix of formats 1/1a/1b and 2/2a/2b $N_{RB}^{(2)}$ Bandwidth available for use by PUCCH formats 2/2a/2b, expressed in multiples of $N_{sc}^{RB}$ $N_{RB}^{DL}$ Downlink bandwidth configuration, expressed in multiples of $N_{sc}^{RB}$ $N_{RB}^{min,\ DL}$ Smallest downlink bandwidth configuration, expressed in multiples of $N_{sc}^{RB}$ $N_{RB}^{max, DL}$ Largest downlink bandwidth configuration, expressed in multiples of $N_{sc}^{RB}$
$N_{RB}^{UL}$ Uplink bandwidth configuration, expressed in multiples of $N_{sc}^{RB}$
$N_{RB}^{min, UL}$ Smallest uplink bandwidth configuration, expressed in multiples of $N_{sc}^{RB}$
$N_{RB}^{max, UL}$ Largest uplink bandwidth configuration, expressed in multiples of $N_{sc}^{RB}$
$N_{symb}^{DL}$ Number of OFDM symbols in a downlink slot
$N_{symb}^{UL}$ Number of SC-FDMA symbols in an uplink slot
$N_{sc}^{RB}$ Resource block size in the frequency domain, expressed as a number of subcarriers
$N_{sb}$ Number of sub-bands for PUSCH frequency-hopping with predefined hopping pattern
$N_{RB}^{sb}$ Size of each sub-band for PUSCH frequency-hopping with predefined hopping pattern, expressed as a number of resource blocks
$n_{PUCCH}^{(1, \tilde{p})}$ Resource index for PUCCH formats 1/1a/1b
$n_{PUCCH}^{(2, \tilde{p})}$ Resource index for PUCCH formats 2/2a/2b
$n_{PUCCH}^{(3, \tilde{p})}$ Resource index for PUCCH formats 3

In some embodiments, when the UE 104 is scheduled for a downlink data transmission in one of the downlink sub-frames 206, the UE 104 is configured to report an acknowledgement, e.g., an Ack/Nack (A/N) report, of the same data in one of the uplink sub-frames 208 according to an example shown in the table below:

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

If the UE 104 has a UL allocation in the uplink sub-frame 208, where it is also supposed to deliver the A/N report to the eNodeB 102, the A/N report is multiplexed with the UL data and sent over the PUSCH of the physical uplink channel 106. If the UE 104 does not have a UL allocation in the uplink sub-frame 208, the A/N report is sent over the PUCCH of the physical uplink channel 106 instead. Under such a scenario, if the UE 104 further does not have a periodic CQI report to be sent to the eNodeB 102, the A/N report is sent over the PUCCH of the physical uplink channel 106 using the Format 1A 1a or 1b. If, on the other hand, the UE 104 does have a periodic CQI report to be sent to the eNodeB 102, the A/N report is sent over the PUCCH of the physical uplink channel 106 using the Format 2a or 2b, ensuring that the CQI report for the downlink and A/N report can be transmitted at the same time. If the periodic SR and the CQI report coincides in any uplink sub-frame 208, the CQI is then dropped if there is a positive SR. In some embodiments, the A/N report can come along with either CQI report or SR report or independently. In some embodiments, when a UE 104 is scheduled in the downlink of any of the D sub-frames 206 and there is no UL resource allocation coinciding with uplink sub-frame 208 in which the A/N report is designated to arrive, the A/N report is transmitted in the PUCCH region of the physical uplink channel 106. In case there is no periodic CQI report scheduled to this UE 104 in this uplink sub-frame 208, then the PUCCH Format 1a or 1b is used. Under such a scenario, the physical resource location in terms of RB is dependent upon the D sub-frame 206 (when it was scheduled) and the physical downlink control channel (PDCCH) location, which leads to a scenario where a lot of PUSCH region needs to be allocated for PUCCH transmission even for a single UE 104 as the physical uplink channel 106 is under a single-carrier frequency-division multiple access scheme (SC-FDMA).

To address the issue discussed above, the PUCCH dimensioning unit 110 configures the PUCCH of the physical uplink channels 106 to reduce the number of RB reservations used by the UEs 104's in the TD-LTE (A) system 100, thereby increasing RBs for shared data channel resource, e.g., PUSCH region of the uplink channel 106. As such, the data throughput of the TD-LTE (A) system 100 is increased and the TD-LTE (A) system 100 can be scaled to support any number of UEs 104 and their users. In some embodiments, the PUCCH dimensioning unit 110 is configured to derive a set of collision free parameters/values for the PUCCH to achieve an increased data throughput of the physical uplink channel 106. In some embodiments, the PUCCH dimensioning unit 110 is configured to adopt an unique combination of input parameters for PUCCH configuration, wherein the input parameters include one or more of: number of sectors of the TD-LTE (A) system 100, number of users/UEs per sector, bandwidth per sector, antennas per sector, uplink/downlink configuration of the TD-LTE (A) system 100, SRS on uplink subframe 208, UpPTS 216, or both, physical random access channel (PRACH) format, and PUCCH Format 1b. In some embodiments, the PUCCH dimensioning unit 110 is configured to output a set of values/parameters for increased uplink throughput, wherein the output values include one or more of: SR, SRS, and CQI resource or report, PRACH index, and N3 PUCCH.

In some embodiments, the PUCCH dimensioning unit 110 is configured to determine the set of parameters for PUCCH configuration of the physical uplink channel 106 between a UE 104 and eNodeB 102 by configuring the CQI report for the UE 104. During the CQI report configuration, the UE 104 reads or receives the CQI report from the eNodeB 102 as part of a file, e.g., PhysicalConfigDedicated. In some embodiments, the UE 104 also receives a set of parameters for the PUCCH of the physical uplink channel 106 from the CQI report in the form of, e.g., PUCCH-ConfigDedicated from the PhysicalConfigDedicated and/or PUCCH-Config-Common from PhysicalConfigCommon. In some embodiments, the CQI report for the PUCCH as determined by the PUCCH dimensioning unit 110 further include one or more of parameters (e.g., nRB-CQI) that denote bandwidth of the PUCCH in terms of RBs that are available for uplink data transmission under one or more of PUCCH Formats 2, 2a/2b in each frame, n1PUCCH-AN (from PUCCH-ConfigCommon) and CQI-ReportConfig etc.

In some embodiments, the PUCCH dimensioning unit 110 is configured to determine and store the same set of parameters for the PUCCH (e.g., PhysicalConfigDedicated and PhysicalConfigCommon) from the CQI report in both the eNodeB 102 and the UE 104 such that the number of RBs available for PUSCH transmission is increased resulting in increased uplink throughput of the TD-LTE (A) system 100. In some embodiments, the UE 104 is configured to read the set of PUCCH configuration from the eNodeB 102 and sets the parameters in terms of periodicity of the CQI report and/or RB resources according to the set of PUCCH parameters. In some embodiments, the periodicity of the CQI report of the UE 104 is set to coincide with an allocated rank indicator (RI) configuration index of the TD-LTE (A) system 100 in order to increase the number of RBs available for PUSCH uplink transmission, wherein the RI configuration index is one of the control information that a UE 104 report to eNodeB 102 on either PUCCH or PUSCH of the uplink channel 106 based on uplink scheduling. In some embodiments, the eNodeB 102 configures the RI reporting periodicity for every UE 104 and each UE 104 has to honor the configured periodicity. In some embodiments, the periodicity of the CQI report of the UE 104 is either 10 ms or 20 ms. With the configured set of parameters for the PUCCH of the physical uplink channel 106, the RB available for the PUSCH of the physical uplink channel 106 for uplink data transmission is increased to the maximum possible level. FIG. 3 depicts an example of allocation of 5 MHz PUSCH region in the physical uplink channel 106 of the TD-LTE (A) system 100 under the proposed approach.

In some embodiments, the PUCCH dimensioning unit 110 is configured to generate and transmit a feedback/acknowledgement in the form of a downlink (DL) hybrid automatic repeat request (HARQ), which is a combination of high-rate forward error-correcting coding and ARQ error-control, on one or more of the following PUCCH resources according to the CQI report in order to increase the number of RBs available for PUSCH uplink transmission:

Uplink control information (UCI)-HARQ: where HARQ PUCCH resource is calculated using the following formula corresponding to DL transmission on a sub-frame where the smallest value in set is:

$$n_{PUCCH}^{(1)} = (M-m-1) \times N_p + m + N_{p+1} + n_{CCE} + N_{PUCCH}^{(1)}$$

In some embodiments, the UE 104 uses the same resources to send the DL HARQ feedback to eNodeB 102 using Format 1a or 1b.

UCI-SR-HARQ: where the UE 104 sends the Ack/Nack report using the UE 104's PUCCH resource according to the SR.

UCI-CQI-HARQ, where the UE 104 sends the Ack/Nack report using the UE 104's PUCCH resource according to the CQI report.

UCI-CQI-SR-HARQ: where the UE 104 sends the Ack/Nack report using the UE 104's SR PUCCH resource if SR is positive or the UE 104's PUCCH resource according to the CQI report if otherwise.

In some embodiments, the UE 104 is configured to generate and transmit reports for the downlink acknowledgement via the PUCCH resource according to the CQI report periodically based on the periodicity configure by higher layers in order to limit the number of RBs used. Here, the periodicity of all periodic CQI reports of the users/UEs 104's is the same and a maximum 6 users/UEs shall be multiplexed in one RB according to the CQI report. In some embodiments, the PUCCH dimensioning unit 110 is configured to ensure that the periodicity of all periodic SRs of the users/UEs 104's are the same. In some embodiments, the PUCCH dimensioning unit 110 is configured to ensure that the periodicity of all periodic SRSs of the users/UEs 104's are the same.

In some embodiments, the PUCCH dimensioning unit 110 is configured to ensure the mutually exclusive occurrence for a particular UE 104 with respect to other UEs 104's to the maximum extent possible. In some embodiments, the PUCCH dimensioning unit 110 is configured to ensure the allocation of RBs for the UEs 104's are distributed across the available uplink sub-frames 208 across multiple frames 200 of the TD-LTE (A) system 100 with the periodicity of such a distribution of the UEs 104 coinciding with the periodicity of their CQI reports. In some embodiments, the PUCCH dimensioning unit 110 is configured to ensure the allocation of the UEs 104's are distributed across the available uplink sub-frames 208 across multiple frames 200 of the TD-LTE (A) system 100 with the periodicity of such a distribution of the UEs 104 coinciding with the periodicity of the SR. In some embodiments, the PUCCH dimensioning unit 110 is configured to ensure the allocation of the UEs 104's are distributed across the available UpPTS 216 and/or uplink sub-frames 208 across multiple frames 200 of the TD-LTE (A) system 100 with the periodicity of such a distribution of the UEs 104 coinciding with the periodicity of the SRS.

Figure 4:
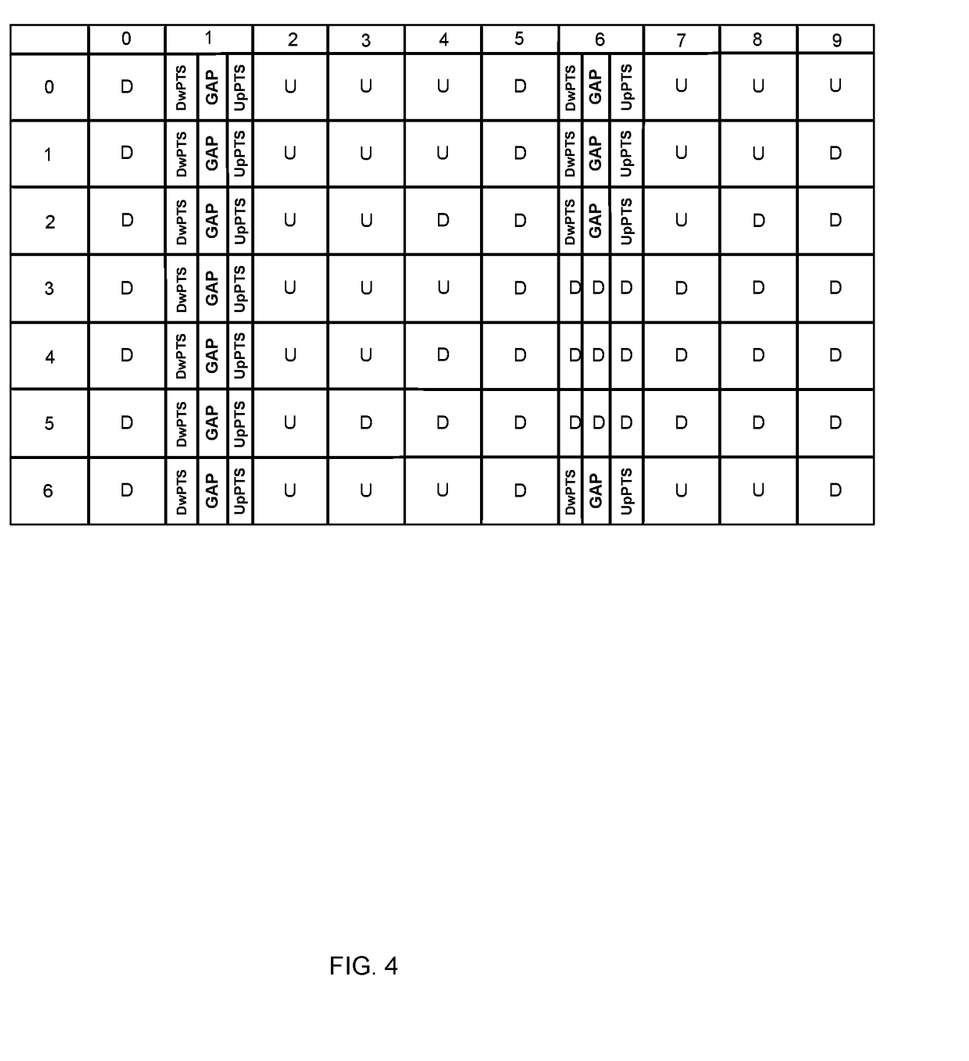
FIG. 4 depicts an example of grouping and scheduling of UEs per transmission time interval (TTI) of the TD-LTE (A) system where the maximum number of users equals 6 according to an aspect of the present embodiments.

In some embodiments, the number of users/UEs 104's to be scheduled per TTI of the TD-LTE (A) system 100, which is the duration of transmission, can be determined as follows. To begin with, the initial value of RB according to the CQI report (e.g., N2-CQI-RB) is set to 1 and is incremented/modified in the following steps. First, a plurality of groups are created for downlink scheduling, wherein all the UEs 104's whose periodic CQI reports are supposed to arrive in a single U sub-frame 208 are grouped together. Here, the number of the groups (num_groups) equals the number of uplink subframes 208 in the expected DL HARQ feedback in a radio time frame. In some embodiments, the UEs 104 are scheduled to a specific group such that the sub-frame for their CQI reports and the sub-frame for the A/N report coincide. In some embodiments, the UEs 104 are divided into groups for downlink scheduling on the basis of their CQI reports. For a non-limiting example, in UL/DL configuration 1, num_groups is 4 since the number of uplink subframes 208 expecting DL HARQ feedback is 4. In UL/DL configuration 0, num_groups equal 4 when SSF configurations other than 0 and 5 are used. Num_groups equals 2 if SSF configurations 0 or 5 are used. In some embodiments, the maximum number of users (max_num_users) out of all the groups is maintained. Here, max_num_users equals the maximum of the number of users in groups 1 through last group. The value of max_num_users is updated whenever any UE 104 attaches or is released from the TD-LTE (A) system 100. Since only 6 users can be multiplexed in one RB according to the CQI report (CQI-RB) in the non-limiting example above, so the groups should be reconfigured with a new value whenever max_num_users exceeds multiples of 6. FIG. 4 depicts an example of grouping and scheduling of users/UEs 104's per TTI of the TD-LTE (A) system 100 where max_num_users equals 6.

Figure 5:
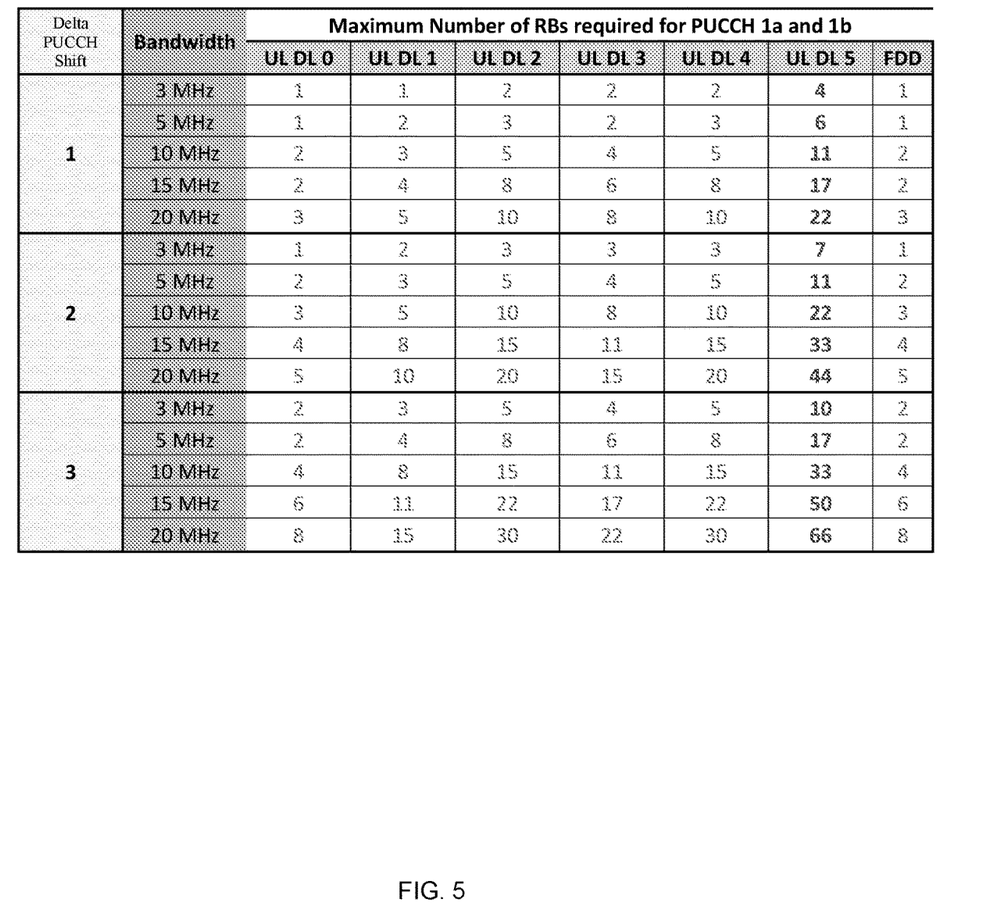
FIG. 5 depicts an example of correlation between the delta PUCCH shift and the maximum number of RBs required for PUCCH format according to an aspect of the present embodiments.

In some embodiments, input parameters for delta PUCCH shift, which indicates the interval between cyclic shifts used for the PUCCH, are derived and used to draw the correlation between the delta PUCCH shift (e.g., 1, 2, and 3) and the maximum number of RBs required for PUCCH Formats 1*a* and 1*b* as shown by the example of the diagram depicted in FIG. 5. By reducing and restricting the number of RB location being used by the PUCCH channel of the physical uplink channel 106, the uplink data throughput is increased.

In some embodiments, the PUCCH dimensioning unit 110 is configured to determine and store the same set of scheduling request parameters (e.g., SchedulingRequestConfig) of the TD-LTE (A) system 100 in both the eNodeB 102 and the UE 104 in such a manner that the number of RBs available for PUSCH transmission is increased resulting in increased uplink throughput of the TD-LTE (A) system 100. In some embodiments, the UE 104 is configured to read the scheduling request parameters and set the PUCCH parameters in terms of periodicity and/or RB resources of scheduling request configuration according to the scheduling request parameters.

In some embodiments, the PUCCH dimensioning unit 110 is configured to determine and store the same set of SRS parameters (e.g., SoundingRS-UL-ConfigDedicated) of the TD-LTE (A) system 100 in both the eNodeB 102 and the UE 104 in such a manner that the number of RBs available for PUSCH transmission is increased resulting in increased uplink throughput of the TD-LTE (A) system 100. In some embodiments, the UE 104 is configured to read the SRS parameters and set the periodicity and/or RB resources of SRS configuration according to the SRS configuration.

In some embodiments, the PUCCH dimensioning unit 110 is configured to schedule the UEs 104's in a downlink in a Round Robin (RR) manner such that the A/N reports of a UE 103 with the downlink scheduled data coincides with the CQI report transmissions of that particular UE 104 irrespective of whether the CQI report is periodic or aperiodic in the TD-LTE (A) system 100 in order to limit the number of RBs used. In some embodiments, the PUCCH dimensioning unit 110 is configured to ensure that any UE 104 is not aged or delayed beyond a certain time period (e.g., 40 ms) from the last time it was scheduled in the downlink so that delay sensitive traffic's part of quality of service (QoS) criteria of the TD-LTE (A) system 100 is fulfilled. In some embodiments, the PUCCH dimensioning unit 110 is configured to ensure that the signaling RBs and/or an Internet protocol (IP) multimedia subsystem (IMS) signaling are not delayed and the both of the them are handled in a priority manner in order to meet the QoS criteria of the TD-LTE (A) system 100.

Figure 6:
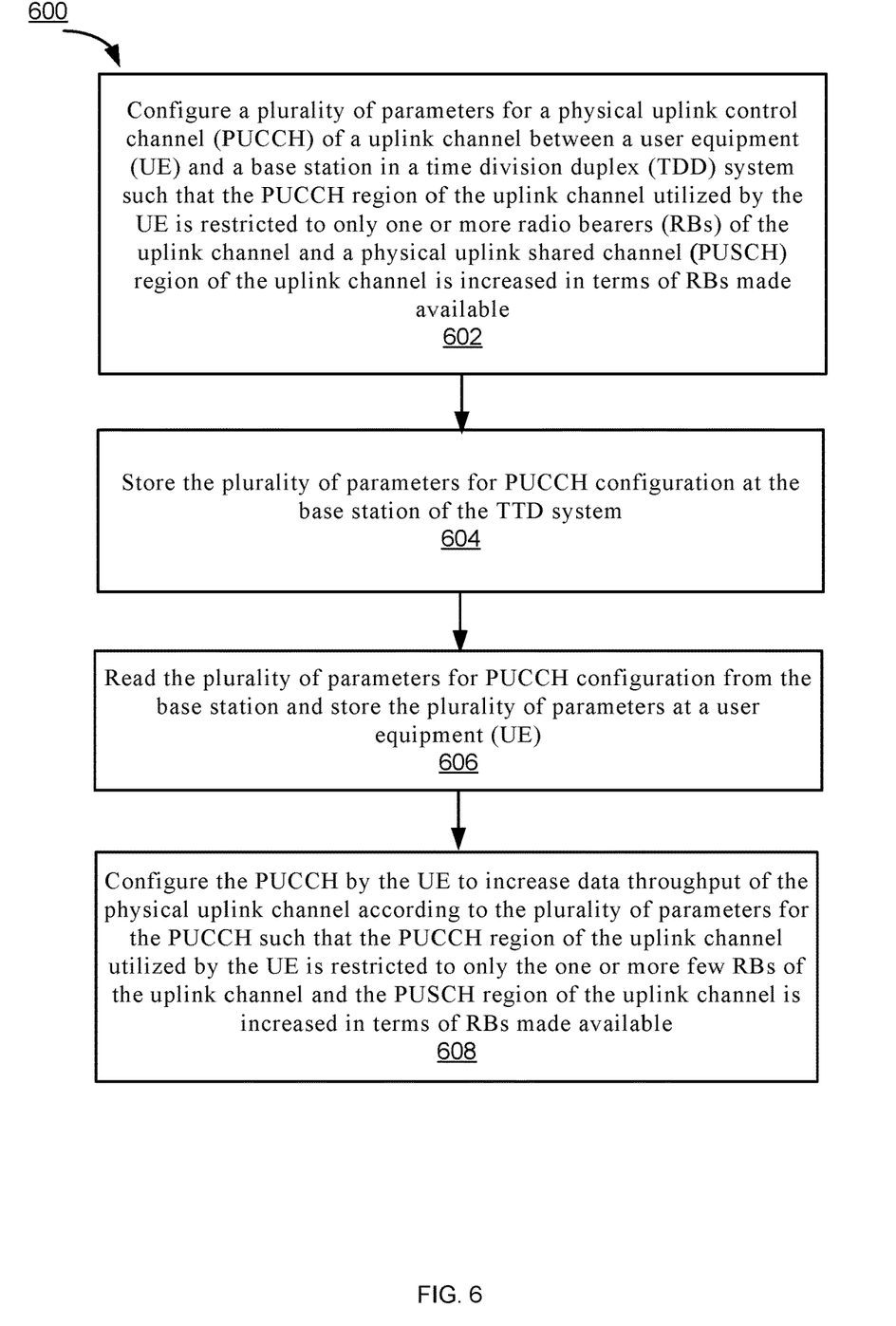
FIG. 6 depicts a flowchart of an example of a process to support uplink data throughput improvement for a TD-LTE (A) system according to an aspect of the present embodiments.

FIG. 6 depicts a flowchart 600 of an example of a process to support hardware-based hierarchical interrupt propagation for efficient interrupt propagation and handling. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 6, the flowchart 600 starts at block 602, where a plurality of parameters are configured for a physical uplink control channel (PUCCH) of an uplink channel between a user equipment (UE) and a base station in a TDD system such that the PUCCH region of the uplink channel utilized by the UE is restricted to only one or more radio bearers (RBs) of the uplink channel and a physical uplink shared channel (PUSCH) region of the uplink channel is increased in terms of RBs made available. The flowchart 600 continues to block 604, where the plurality of parameters for PUCCH configuration are stored at the base station of the TDD system. The flowchart 600 continues to block 604, where the plurality of parameters for PUCCH configuration are read from the base station and the plurality of parameters are stored at a user equipment (UE). The flowchart 600 ends at block 608, where the PUCCH is configured by the UE to increase data throughput of the physical uplink channel according to the plurality of parameters for the PUCCH such that the PUCCH region of the uplink channel utilized by the UE is restricted to only the one or more RBs of the uplink channel and the PUSCH region of the uplink channel is increased in terms of RBs made available.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system to support uplink data throughput improvement for a time division duplex (TDD) system, comprising:
   a dimensioning unit that
      configures a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;
      stores the plurality of parameters for PUCCH configuration at the base station of the TTD system; and
      schedules the UE to be within a certain time period from the last time it was scheduled in a downlink so that delay sensitive traffic's part of quality of service (QoS) criteria of the TTD system is met;
   said UE configured to
      read the plurality of parameters for PUCCH configuration from the base station and store the plurality of parameters at the UE;
      configure the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available.

2. The system of claim 1, wherein:
the UE is a mobile device or a data terminal.

3. The system of claim 1, wherein:
the plurality of configured PUCCH parameters include a channel quality indicator (CQI) report, which carries information on quality of the uplink channel in the TDD system.

4. The system of claim 3, wherein:
the dimensioning unit increases data throughput of the physical uplink channel between the UE and the base station by configuring the CQI report of the uplink channel.

5. The system of claim 3, wherein:
the dimensioning unit sets periodicity of the CQI report and/or the RBs according to the plurality of parameters for PUCCH configuration to increase data throughput of the physical uplink channel.

6. The system of claim 5, wherein:
the dimensioning unit sets the periodicity of the CQI report to coincide with an allocated rank indicator (RI) configuration index of the TDD system.

7. The system of claim 1, wherein:
the dimensioning unit generates and transmits an acknowledgement (ACK) report in the form of a hybrid automatic repeat request (HARQ) to increase data throughput of the physical uplink channel, wherein the HARQ is a combination of high-rate forward error-correcting coding and ARQ error-control, on one or more of the PUCCH parameters.

8. The system of claim 1, wherein:
the dimensioning unit determines and stores a same set of scheduling request (SR) parameters of the TDD system in both the base station and the UE such that the number of RBs available for PUSCH transmission is increased;
the UE is configured to read the scheduling request parameters and set a periodicity and/or RB resources according to the scheduling request parameters.

9. The system of claim 1, wherein:
the dimensioning unit determines and stores a same set of sounding reference signal (SRS) parameters of the TDD system in both the base station and the UE in such a manner that the number of RBs available for PUSCH transmission is increased;
the UE is configured to read the SRS parameters and set the periodicity and/or RB resources of SRS configuration according to the SRS parameters.

10. The system of claim 3, further comprising:
a plurality of UEs wherein periodicity of the plurality of UEs in the TDD system for one or more of periodic CQI, scheduling request (SR), and sounding reference signal (SRS) is the same.

11. The system of claim 10, wherein:
the dimensioning unit distributes the plurality of UEs across available uplink sub-frames of multiple frames of the TDD system wherein the periodicity of such distribution of the plurality of UEs coincides with the periodicity of one or more of the CQI, the SR, and the SRS.

12. The system of claim 10, wherein:
the dimensioning unit enables mutually exclusive occurrence for a particular UE with respect to other UEs in the plurality of UEs.

13. The system of claim 1, wherein:
the dimensioning unit handles the RBs and/or an Internet protocol (IP) multimedia subsystem (IMS) signaling in a priority manner in order to meet the QoS criteria of the TDD system.

14. A method to support uplink data throughput improvement for a time division duplex (TDD) system, comprising:
configuring a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;
storing the plurality of parameters for PUCCH configuration at the base station of the TTD system;
reading the plurality of parameters for PUCCH configuration from the base station and storing the plurality of parameters at a user equipment (UE);
configuring the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available; and
scheduling the UE to be within a certain time period from the last time it was scheduled in a downlink so that delay sensitive traffic's part of quality of service (QoS) criteria of the TTD system is met.

15. The method of claim 14, wherein:
the plurality of configured PUCCH parameters include a channel quality indicator (CQI) report, which carries information on quality of the uplink channel in the TDD system.

16. The method of claim 15, further comprising:
increasing data throughput of the physical uplink channel between the UE and the base station by configuring the CQI report of the uplink channel.

17. The method of claim 15, further comprising:
setting periodicity of the CQI report and/or the RBs according to the plurality of parameters for PUCCH configuration to increase data throughput of the physical uplink channel.

18. The method of claim 17, further comprising:
setting the periodicity of the CQI report to coincide with an allocated rank indicator (RI) configuration index of the TDD system.

19. The method of claim 14, further comprising:
generating and transmitting an acknowledgement (ACK) report in the form of a hybrid automatic repeat request (HARQ) to increase data throughput of the physical uplink channel, wherein the HARQ is a combination of high-rate forward error-correcting coding and ARQ error-control, on one or more of the PUCCH parameters.

20. The method of claim 14, further comprising:
determining and storing a same set of scheduling request (SR) parameters of the TDD system in both the base station and the UE such that the number of RBs available for PUSCH transmission is increased;
reading the scheduling request parameters and setting the periodicity and/or RB resources according to the scheduling request parameters.

21. The method of claim 14, further comprising:
determining and storing a same set of sounding reference signal (SRS) parameters of the TDD system in both the base station and the UE in such a manner that the number of RBs available for PUSCH transmission is increased;
reading the SRS parameters and setting the periodicity and/or RB resources of SRS configuration according to the SRS parameters.

22. The method of claim 15, wherein:
periodicity of a plurality of UEs in the TDD system for one or more of periodic CQI, scheduling request (SR), and sounding reference signal (SRS) is the same.

23. The method of claim 22, further comprising:
distributing the plurality of UEs across available uplink sub-frames of multiple frames of the TDD system wherein the periodicity of such distribution of the plurality of UEs coincides with the periodicity of one or more of the CQI, the SR, and the SRS.

24. The method of claim 22, further comprising:
enabling mutually exclusive occurrence for a particular UE with respect to other UEs in the plurality of UEs.

25. The method of claim 14, further comprising:
handling the RBs and/or an Internet protocol (IP) multimedia subsystem (IMS) signaling in a priority manner in order to meet the QoS criteria of the TDD system.

26. A system to support uplink data throughput improvement for a time division duplex (TDD) system, comprising:
a dimensioning unit that
configures a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;

stores the plurality of parameters for PUCCH configuration at the base station of the TTD system;

said UE configured to read the plurality of parameters for PUCCH configuration from the base station and store the plurality of parameters at the UE;

configure the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available, wherein the plurality of configured PUCCH parameters include a channel quality indicator (CQI) report, which carries information on quality of the uplink channel in the TDD system, and wherein the dimensioning unit increases data throughput of the physical uplink channel between the UE and the base station by configuring the CQI report of the uplink channel.

27. A system to support uplink data throughput improvement for a time division duplex (TDD) system, comprising:

a dimensioning unit that configures a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;

stores the plurality of parameters for PUCCH configuration at the base station of the TTD system;

said UE configured to read the plurality of parameters for PUCCH configuration from the base station and store the plurality of parameters at the UE;

configure the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available, wherein the plurality of configured PUCCH parameters include a channel quality indicator (CQI) report, which carries information on quality of the uplink channel in the TDD system, wherein the dimensioning unit sets periodicity of the CQI report and/or the RBs according to the plurality of parameters for PUCCH configuration to increase data throughput of the physical uplink channel.

28. A system to support uplink data throughput improvement for a time division duplex (TDD) system, comprising:

a dimensioning unit that configures a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;

stores the plurality of parameters for PUCCH configuration at the base station of the TTD system; and generates and transmits an acknowledgement (ACK) report in the form of a hybrid automatic repeat request (HARQ) to increase data throughput of the physical uplink channel, wherein the HARQ is a combination of high-rate forward error-correcting coding and ARQ error-control, on one or more of the PUCCH parameters;

said UE configured to read the plurality of parameters for PUCCH configuration from the base station and store the plurality of parameters at the UE;

configure the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available.

29. A system to support uplink data throughput improvement for a time division duplex (TDD) system, comprising:

a dimensioning unit that configures a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;

stores the plurality of parameters for PUCCH configuration at the base station of the TTD system;

said UE configured to read the plurality of parameters for PUCCH configuration from the base station and store the plurality of parameters at the UE;

configure the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available, wherein the plurality of configured PUCCH parameters include a channel quality indicator (CQI) report, which carries information on quality of the uplink channel in the TDD system, wherein the system further comprises a plurality of UEs wherein periodicity of the plurality of UEs in the TDD system for one or more of periodic CQI, scheduling request (SR), and sounding reference signal (SRS) is the same, wherein the dimensioning unit distributes the plurality of UEs across available uplink sub-frames of multiple frames of the TDD system wherein the periodicity of such distribution of the plurality of UEs coincides with the periodicity of one or more of the CQI, the SR, and the SRS.

30. A system to support uplink data throughput improvement for a time division duplex (TDD) system, comprising:
a dimensioning unit that
configures a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;
stores the plurality of parameters for PUCCH configuration at the base station of the TTD system;
said UE configured to
read the plurality of parameters for PUCCH configuration from the base station and store the plurality of parameters at the UE;
configure the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available, wherein the plurality of configured PUCCH parameters include a channel quality indicator (CQI) report, which carries information on quality of the uplink channel in the TDD system,
wherein the system further comprises a plurality of UEs wherein periodicity of the plurality of UEs in the TDD system for one or more of periodic CQI, scheduling request (SR), and sounding reference signal (SRS) is the same, wherein the dimensioning unit enables mutually exclusive occurrence for a particular UE with respect to other UEs in the plurality of UEs.

31. A method to support uplink data throughput improvement for a time division duplex (TDD) system, comprising:
configuring a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;
storing the plurality of parameters for PUCCH configuration at the base station of the TTD system;
reading the plurality of parameters for PUCCH configuration from the base station and storing the plurality of parameters at a user equipment (UE);
configuring the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available, wherein the plurality of configured PUCCH parameters include a channel quality indicator (CQI) report, which carries information on quality of the uplink channel in the TDD system; and
increasing data throughput of the physical uplink channel between the UE and the base station by configuring the CQI report of the uplink channel.

32. A method to support uplink data throughput improvement for a time division duplex (TDD) system, comprising:
configuring a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;
storing the plurality of parameters for PUCCH configuration at the base station of the TTD system;
reading the plurality of parameters for PUCCH configuration from the base station and storing the plurality of parameters at a user equipment (UE);
configuring the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available, the plurality of configured PUCCH parameters include a channel quality indicator (CQI) report, which carries information on quality of the uplink channel in the TDD system; and
setting periodicity of the CQI report and/or the RBs according to the plurality of parameters for PUCCH configuration to increase data throughput of the physical uplink channel.

33. A method to support uplink data throughput improvement for a time division duplex (TDD) system, comprising:
configuring a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;
storing the plurality of parameters for PUCCH configuration at the base station of the TTD system;
reading the plurality of parameters for PUCCH configuration from the base station and storing the plurality of parameters at a user equipment (UE);
configuring the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available; and
generating and transmitting an acknowledgement (ACK) report in the form of a hybrid automatic repeat request (HARQ) to increase data throughput of the physical uplink channel, wherein the HARQ is a combination of high-rate forward error-correcting coding and ARQ error-control, on one or more of the PUCCH parameters.

34. A method to support uplink data throughput improvement for a time division duplex (TDD) system, comprising:
configuring a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;

storing the plurality of parameters for PUCCH configuration at the base station of the TTD system;

reading the plurality of parameters for PUCCH configuration from the base station and storing the plurality of parameters at a user equipment (UE);

configuring the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available, wherein the plurality of configured PUCCH parameters include a channel quality indicator (CQI) report, which carries information on quality of the uplink channel in the TDD system, and wherein periodicity of a plurality of UEs in the TDD system for one or more of periodic CQI, scheduling request (SR), and sounding reference signal (SRS) is the same; and distributing the plurality of UEs across available uplink sub-frames of multiple frames of the TDD system wherein the periodicity of such distribution of the plurality of UEs coincides with the periodicity of one or more of the CQI, the SR, and the SRS.

35. A method to support uplink data throughput improvement for a time division duplex (TDD) system, comprising:

configuring a plurality of parameters for a physical uplink control channel (PUCCH) of an uplink channel between a user equipment (UE) and a base station in the TDD system such that a number of radio bearers (RBs) reserved for the PUCCH of the uplink channel utilized by the UE is restricted and reduced to only one or more RBs of the uplink channel and a physical uplink shared channel (PUSCH) of the uplink channel is reserved and increased in terms of RBs made available;

storing the plurality of parameters for PUCCH configuration at the base station of the TTD system;

reading the plurality of parameters for PUCCH configuration from the base station and storing the plurality of parameters at a user equipment (UE);

configuring the PUCCH to increase data throughput of the physical uplink channel according to the plurality of parameters for the PUCCH such that the PUCCH of the uplink channel utilized by the UE is restricted to only the one or more RBs of the uplink channel and the PUSCH of the uplink channel is increased in terms of RBs made available, wherein the plurality of configured PUCCH parameters include a channel quality indicator (CQI) report, which carries information on quality of the uplink channel in the TDD system, and wherein periodicity of a plurality of UEs in the TDD system for one or more of periodic CQI, scheduling request (SR), and sounding reference signal (SRS) is the same; and enabling mutually exclusive occurrence for a particular UE with respect to other UEs in the plurality of UEs.

* * * * *